(12) United States Patent
Schlimbach et al.

(10) Patent No.: US 8,291,790 B2
(45) Date of Patent: Oct. 23, 2012

(54) SHARPENING DEVICE FOR MANUALLY SHARPENING THE CUTTING TEETH OF SAW CHAINS FOR CHAIN SAWS

(75) Inventors: Klemens Schlimbach, Neunkirchen (DE); Bernd Kruse, Gummersbach (DE)

(73) Assignee: August Rüggeberg GmbH & Co. KG, Marienheide (DE)

( * ) Notice: Subject to any disclaimer, the term of this patent is extended or adjusted under 35 U.S.C. 154(b) by 183 days.

(21) Appl. No.: 12/906,423

(22) Filed: Oct. 18, 2010

(65) Prior Publication Data
US 2011/0088515 A1 Apr. 21, 2011

(30) Foreign Application Priority Data
Oct. 17, 2009 (EP) .................................... 09013133

(51) Int. Cl.
*B23D 63/16* (2006.01)
(52) U.S. Cl. ............................ 76/80.5; 76/36; 407/29.15
(58) Field of Classification Search ................. 76/31, 36, 76/80.5, 82, 88; 407/29.15
See application file for complete search history.

(56) References Cited

U.S. PATENT DOCUMENTS

| 193,209 | A | * | 7/1877 | Atkins | 76/36 |
| 1,906,881 | A | * | 5/1933 | Olas | 76/36 |
| 3,349,460 | A | * | 10/1967 | Kephart, Jr. | 407/29.15 |
| 3,518,900 | A | * | 7/1970 | Lavier et al. | 76/36 |
| 3,901,105 | A | * | 8/1975 | Ayer | 76/36 |
| 4,327,605 | A | | 5/1982 | Strojny | |
| 4,584,745 | A | * | 4/1986 | Seiber | 76/80.5 |
| 4,587,868 | A | * | 5/1986 | Kuwica | 76/36 |
| 4,594,919 | A | * | 6/1986 | Southard | 76/36 |
| 4,903,552 | A | * | 2/1990 | Kuwica | 76/36 |

FOREIGN PATENT DOCUMENTS

DE 29 33 293 B1 11/1980
DE 94 08 585 U1 4/1995

* cited by examiner

*Primary Examiner* — Hwei C Payer
(74) *Attorney, Agent, or Firm* — Browdy and Neimark, PLLC

(57) ABSTRACT

A sharpening device for manually sharpening the cutting teeth of saw chains for chain saws has a frame, which has two head parts (spaced apart from one another and two pairs of guide rods which are, in each case, arranged parallel to one another and to a longitudinal axis and rigidly connect the head parts to one another. Parallel to the longitudinal axis, round files and two file faces are held without play, but exchangeably in the head parts. The pairs of guide rods and the respective associated round files and the respective file faces are arranged rotationally symmetrically with respect to the longitudinal axis.

6 Claims, 7 Drawing Sheets

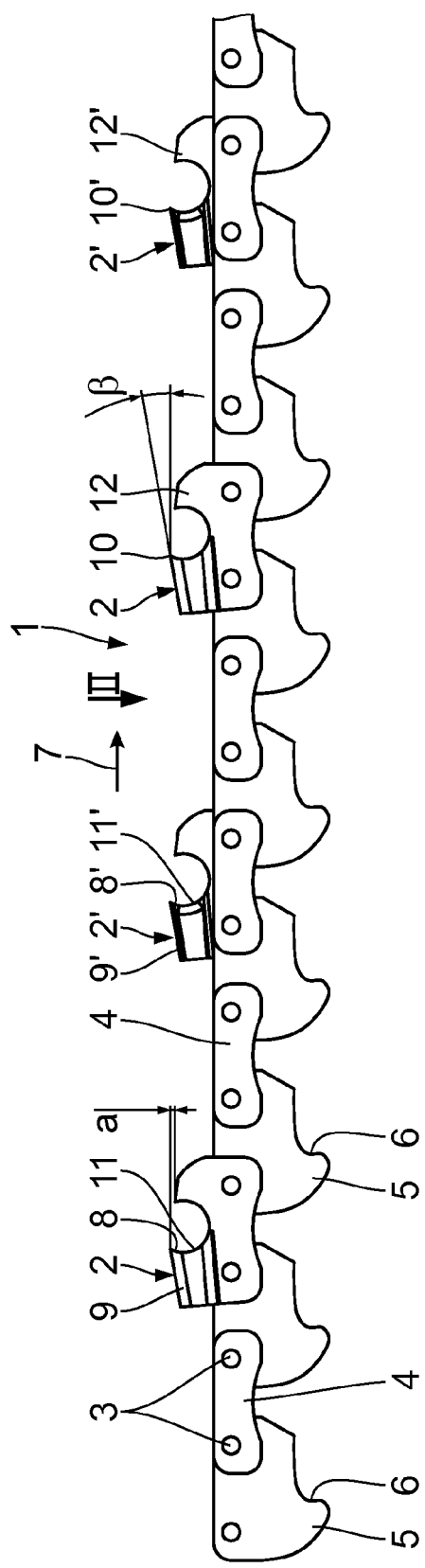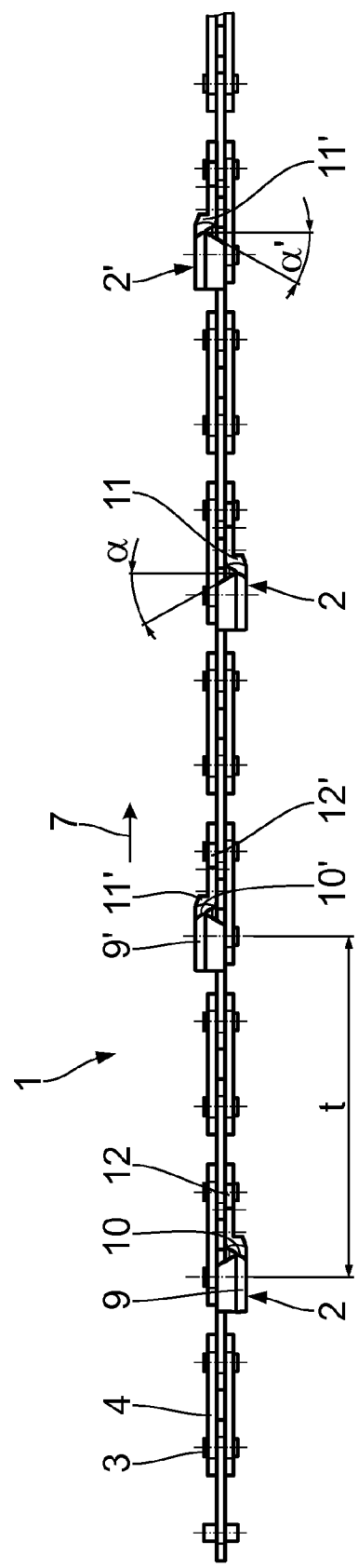

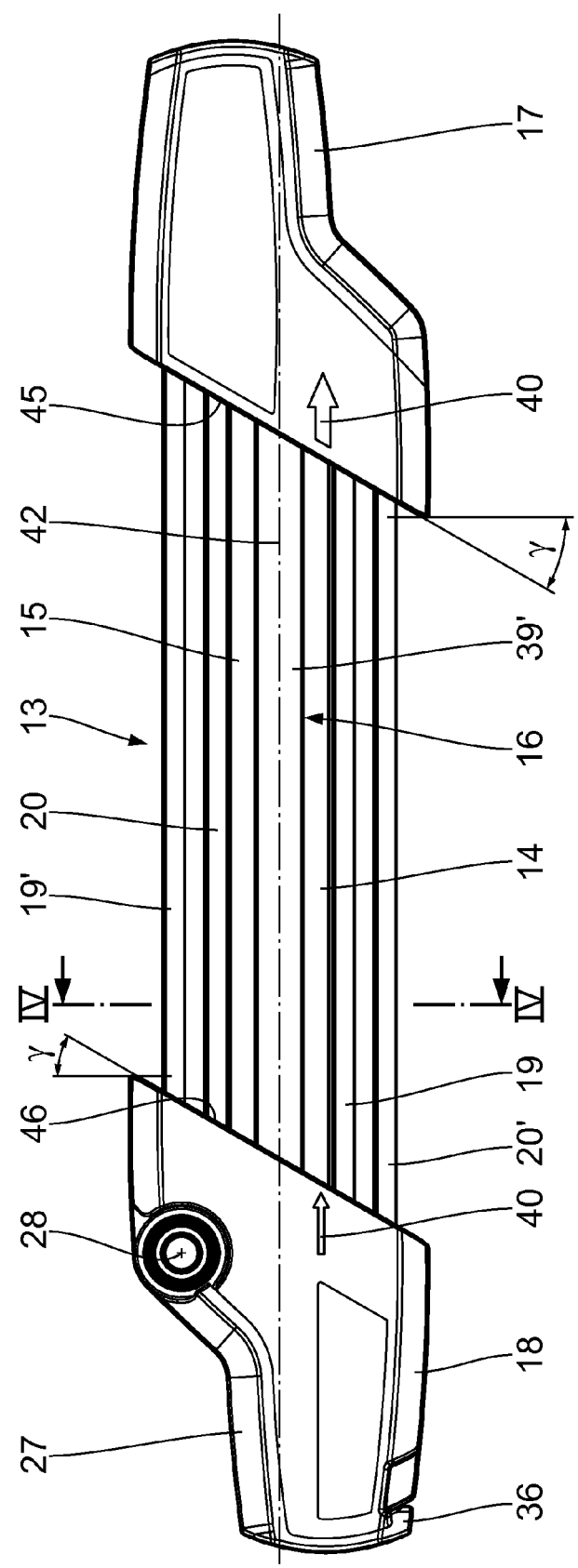

Fig. 5

SHARPENING DEVICE FOR MANUALLY SHARPENING THE CUTTING TEETH OF SAW CHAINS FOR CHAIN SAWS

FIELD OF THE INVENTION

The invention relates to a sharpening device for manually sharpening the cutting teeth of saw chains for chain saws.

BACKGROUND OF THE INVENTION

Chain saws, so that their optimal cutting performance is retained, have to be sharpened at regular intervals. In chain saws with improperly sharpened cutting teeth of the saw chains, the saw chains run erratically, the cutting performance decreases and in the worst cases, the saw chain may even tear which can in turn lead to serious accidents. The aforementioned drawbacks also lead to a high level of wear and failures of the drive machine of the chain saw.

A sharpening tool of the general type is known from DE 29 33 293 B1 (corresponding to U.S. Pat. No. 4,427,605), having a frame, which is substantially formed by two end pieces or head parts, which are connected to one another by two mutually parallel guide rods. A handle is additionally fastened to one end piece. A round file and a square file are exchangeably mounted in the end pieces or head parts. The round file is provided with a file helve which is simultaneously used as a handle of the sharpening device. Each second cutting tooth of the saw chain is filed in an arrangement of the round file and square file. To file the respective second other cutting tooth, the square file and the round file are removed from their mounting in the head parts and inserted in the opposite direction in the frame. The file helve is also removed here from one respective head part and during the changing over of the round file, inserted in the other head part and is then used as the handle of the sharpening tool. The respectively required conversion of the sharpening device is laborious.

By increasing filing off of the tooth front with the cutting face, the cutting edge changes its position perpendicular to the cutting direction, and in fact comes closer and closer to the actual saw chain, as the free face of each cutting tooth has a relief angle relative to the cutting direction, so the tooth back limited by the free face does not grind or rub on the wood to be cut. Since the guide rods rest on the free faces of two adjacent cutting teeth, the profile of the cutting face and the tooth front are displaced parallel to the free face when sharpening the cutting edge by filing the cutting face and the tooth front. The depth limiter is also filed off simultaneously, so the cutting depth, i.e. the spacing between the cutting edge and depth limiter, always remains constant perpendicular to the cutting direction.

The invention is based on the object of providing a sharpening device of the general type, which allows alternate sharpening of the respective alternating different teeth of a saw chain without conversion of the sharpening device.

This object is achieved according to the invention in a sharpening device for manually sharpening the cutting teeth of saw chains for chain saws,
with a longitudinal axis,
with a frame, which has
  a first head part and a second head part arranged at a spacing from one another and
  two pairs of, in each case, two guide rods, which are arranged parallel to one another and to the longitudinal axis and rigidly connect the first and the second head part to one another,
with in each case one round file associated with each pair of guide rods and arranged parallel to the longitudinal axis, which round files are held in the first and the second head part without play in the longitudinal direction and transverse thereto, but exchangeably in round file receivers,
with two mutually parallel file faces on one flat file, which is held without play in the longitudinal direction and transverse thereto, but exchangeably in flat file receivers,
wherein the pairs of guide rods and the respectively associated round files and the file faces are rotationally symmetrically arranged with respect to the longitudinal axis.

It is achieved by the measures according to the invention that the cutting device only has to be rotated about its longitudinal axis if a change is to be made from one type of cutting tooth to the other cutting tooth. The two file faces for filing the two different types of depth limiters have different file directions.

The configuration according to FIG. 2 is particularly advantageous as all the files can be changed in a very simple manner according to wear. During the use of the sharpening device, on the other hand, a removal and reinsertion of the unworn files is not necessary.

Further advantages, features and details of the invention emerge from the following description of an embodiment with the aid of the drawings.

BRIEF DESCRIPTION OF THE DRAWINGS

FIG. 1 shows a side longitudinal view of a part piece of a saw chain to be sharpened, FIG. 2 shows a plan view of the saw chain according to FIG. 1 in accordance with the viewing arrow II in FIG. 1, FIG. 3 shows a side longitudinal view of a sharpening device according to the invention, FIG. 5 shows a longitudinal section through the sharpening device in accordance with the cutting line V-V in FIG. 4.

DESCRIPTION OF THE PREFERRED EMBODIMENT

Figure 4:
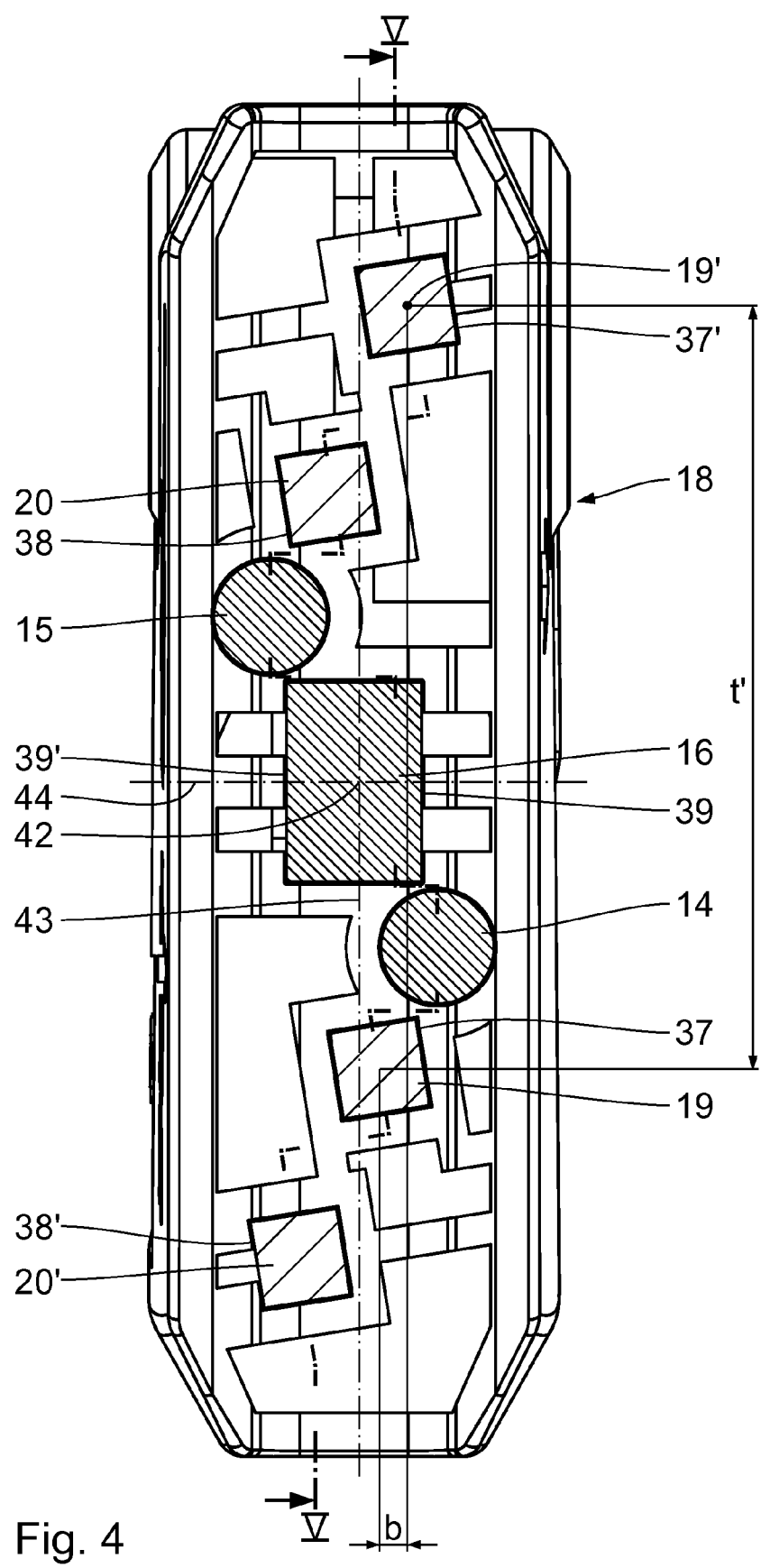
FIG. 4 shows a cross-section through the sharpening device according to FIG. 3 in accordance with the cutting line IV-IV in FIG. 3.

To facilitate understanding, a saw chain 1 shown in FIGS. 1 and 2 for a chain saw will firstly be described. The saw chain 1 has cutting teeth 2, 2', which are always alternating with one another and are configured mirror-symmetrically with respect to one another, in other words cutting alternately to the left and right and which are connected by means of rivets 3 to normal chain members 4 to form an articulated saw chain 1. A pair of chain members 4 is arranged downstream and upstream of each cutting tooth 2 or 2', only then followed again by a further cutting tooth 2' or 2. Arranged centrally, in each case, between the pair of chain members 4 or between a cutting tooth 2 or 2' and an associated chain member 4 are connecting members 5, which are in each case provided with a tooth 6 to engage in a drive wheel of a chain saw. The saw chain 1 and therefore the cutting teeth 2, 2' are moved to cut wood in the cutting direction 7. The cutting teeth 2, 2' in each case have a cutting face 8 or 8' and a free face 9 or 9'. The cutting edge 10 or 10' formed by the penetration line of the cutting face 8 or 8' and free face 9 or 9' has a sharpening angle α of 30 to 35°, which is formed into a line extending perpendicular to the cutting direction 7. A sharpening angle α or α' of this type, which does not equal zero, is used to produce a so-called drawing cut. Mounted in front of the tooth front 11 or 11' is a depth limiter 12 or 12', which fixes the cutting depth a. The free face 9 or 9' forms a relief angle β with respect to the cutting direction 7 of a few degrees, so the free face 9 or 9' is free of the wood to be cut behind the cutting point on the blade 10 or 10'.

Figure 6:
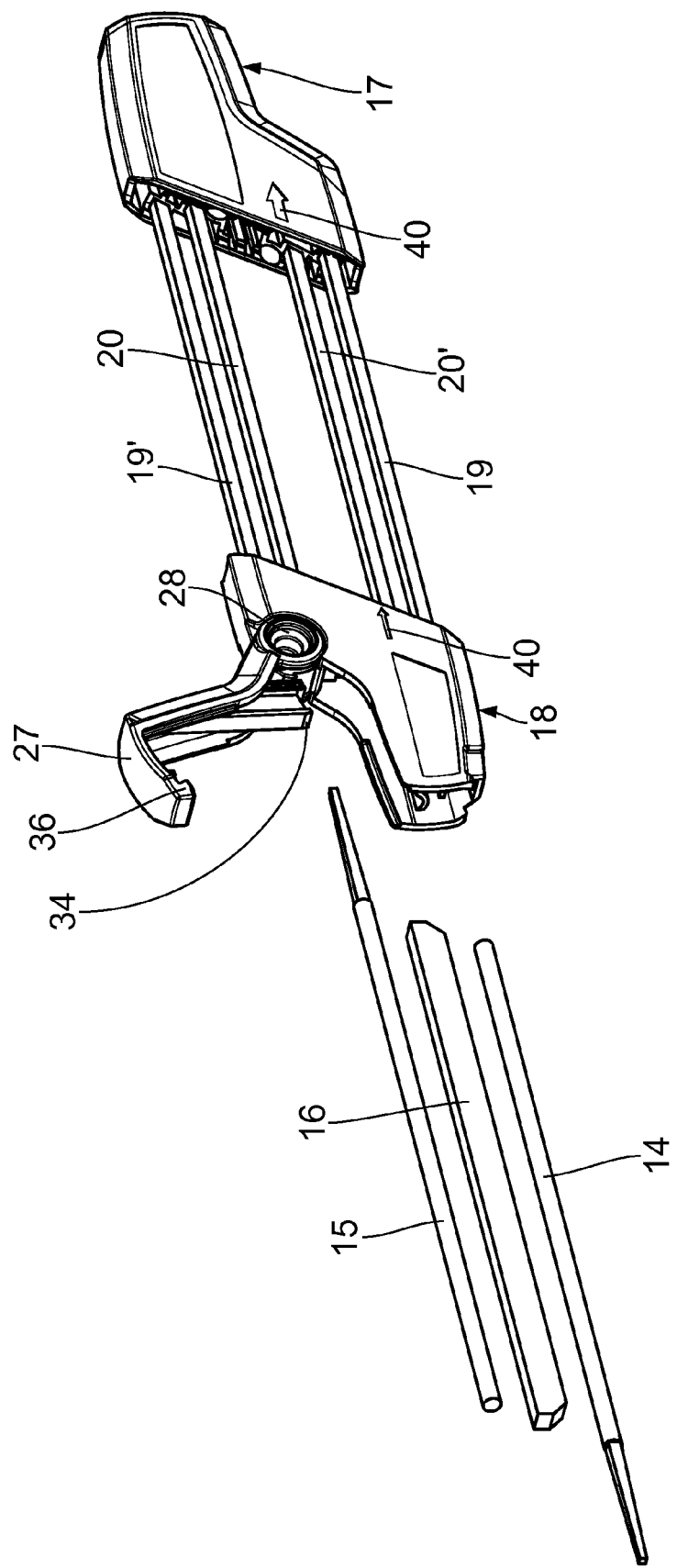
FIG. 6 shows a perspective exploded view of the sharpening device with the round files removed and the flat file removed.

The sharpening device shown in the drawing has a frame 13 for mounting and guiding two round files 14, 15 and a flat file 16. The frame 13 consists of two head parts 17, 18 and four guide rods 19, 19' and 20, 20' arranged parallel to one another and connecting these two head parts 17, 18. Configured in the head part 17 are three receivers 21, 22, 23 for the round files 14, 15 and the flat file 16, which in each case have a base being used as a stop or abutment 24, 25, 26 to support the round files 14, 15 and the flat file 16 against displacement in their longitudinal direction. The receivers 21, 22, 23 are adapted cross-sectionally to the round files 14, 15 or the flat file 16 in such a way that the files 14, 15 are mounted substantially free of play transverse to their longitudinal direction. The insertion or removal of the round files 14, 15 and the flat file 16 takes place by means of the head part 18. For this purpose, the head part 18 is provided with a loading flap 27, which can be opened or closed about a pivot pin 28, as can be inferred, in particular, from FIG. 6. The head part 18 has receivers 29, 30, 31 also cross-sectionally adapted to the files 14, 15, 16 for the round files 14, 15 and the flat file 16, in which the files 14, 15, 16 are mounted substantially free of play transverse to their longitudinal direction. Configured on the loading flap 27 are also three stops being used as abutments 32, 33, 34 for the files 14, 15, 16, against which the files 14, 15, 16 non-displaceably rest in their longitudinal direction. These abutments 32, 33, 34 are loaded by a spring element arranged in the loading flap 27 in the longitudinal direction of the files 14, 15, 16, so, overall, a support that is free of play of the files 14, 15, 16 is achieved in their longitudinal direction in the frame 13. The loading flap 27 is locked, in the closed state, to the head part 18 by means of a latching fastener 36.

As can be inferred, in particular from FIG. 4, one pair of guide rods 19, 19' is allocated to the round file 14 and the other pair of guide rods 20, 20' is allocated to the other round file 15, the guide rod 19 being arranged very close to the round file 14, while the guide rod 19' is provided remote from this. The same applies to the guide rods 20, 20' in relation to the round file 15. The reason for this is that the guide rod 19 or 20 adjacent to the respective round file 14 or 15 is placed on the free face 9 or 9' of the cutting tooth 2 or 2', which is to be sharpened with the adjacent round file 14 or 15. The respective other guide rod 19' or 20' is placed on the corresponding free face 9' or 9 of the respective adjacent cutting tooth 2' or 2.

Figure 7:
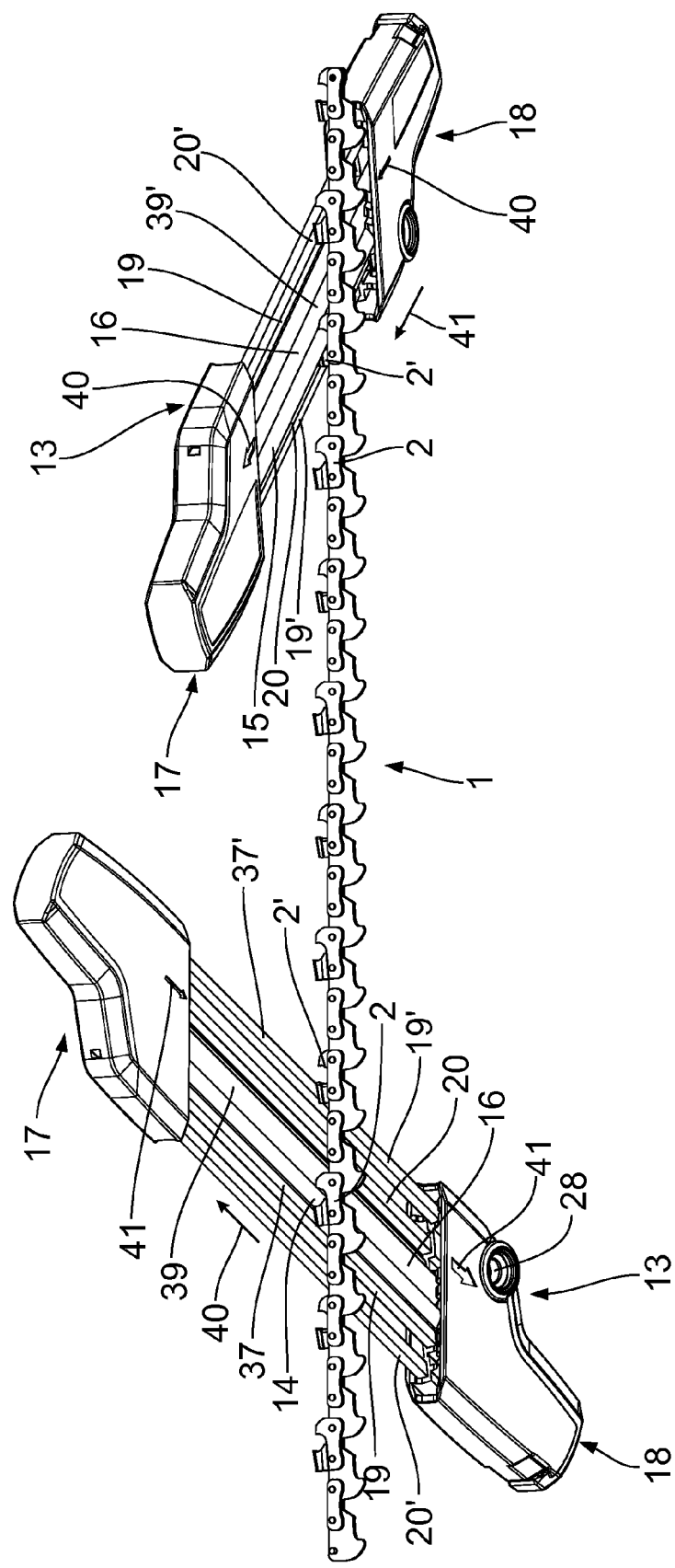
FIG. 7 shows a sharpening device in sharpening use on a saw chain, in a double view in accordance with the two sharpening uses
Figure 8:
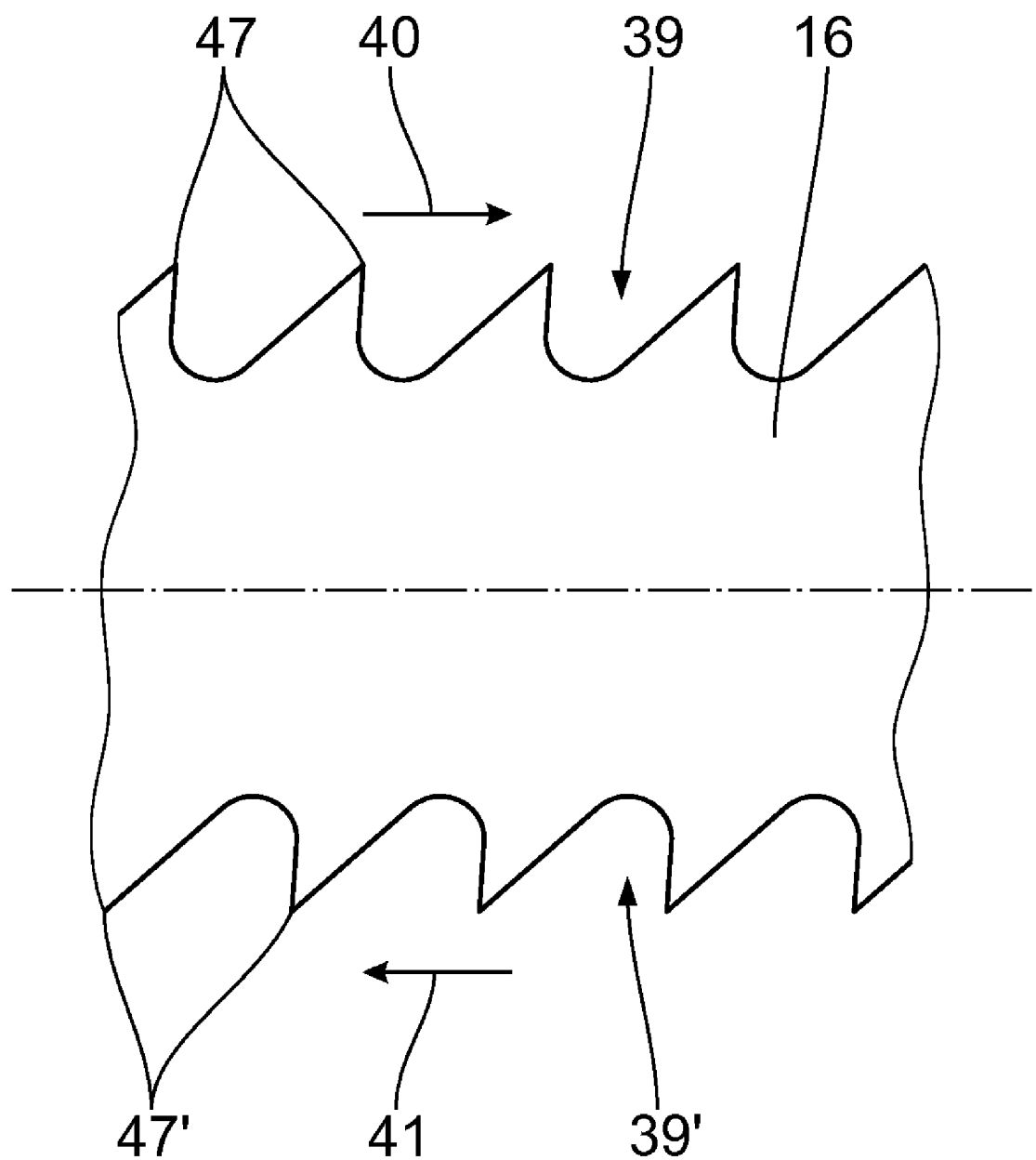
FIG. 8 shows a partial detail of a flat file to be used in the sharpening device according to the invention.

Since—as can be inferred from FIG. 7—the sharpening device is placed at the sharpening angle α or α' relative to the longitudinal direction of the saw chain 1 defined by the cutting direction 7, the centre spacing t' of the guide rods 19 and 19' or 20 and 20' from one another, in each case, is smaller than the division t of the saw chain 1.

The support face 37 or 37' of the guide rods 19, 19' resting on a free face 9 or 9' of the corresponding cutting tooth 2 or 2' is inclined in accordance with the incline of the free faces 9, 9'. The same applies to the support faces 38, 38' of the guide rods 20, 20'. As the free faces 9, 9' have an incline transverse to the longitudinal direction of the saw chain 1 predetermined by the cutting direction 7, a height offset b of the support faces 37, 37' and the support faces 38, 38' is also produced in each case with respect to one another, as can be seen from FIG. 4.

As emerges from FIG. 7 on the left, a sharpening of the cutting teeth 2 takes place such that the round file 14 is located in the cutting tooth 2. The guide rod 19 is located here on the free face 9 of the cutting tooth 2. The guide rod 19' rests on the free face 9' of the adjacent cutting tooth 2'. The flat file 16 rests with its flat file face 39 on the depth limiter 12 of the cutting tooth 2. As filing always takes place by pressing and not pulling, the sharpening of the cutting tooth 2 takes place in the direction 40 in accordance with the arrows on the head parts 17 and 18. The sharpening of the cutting teeth 2 thus takes place here in such a way that the operator presses against the head part 18. If, on the other hand, the cutting teeth 2' are to be sharpened, the file is set in accordance with the view in FIG. 7 on the right. The pushing or pressing of the sharpening device takes place here in the direction 41 in accordance with the arrows on the respective other side of the head parts 17, 18. In this case, the operator presses against the head part 17, in other words in the direction toward the head part 18. The flat file face 39' rests here against the depth limiter 12' of the respective cutting tooth 2'. In order to allow the change from sharpening the cutting teeth 2 to the cutting teeth 2', only a rotation of the sharpening device about its longitudinal axis 42, is necessary, i.e. the direction arrows 41, which during sharpening of the cutting teeth 2 in accordance with FIG. 7 on the left, are at the bottom, arrive owing to the longitudinal rotation of the sharpening device about its longitudinal axis 42 at the top, which can be seen from FIG. 7, on the right where the opposite direction arrow 40 is at the bottom. The reverse applies accordingly.

As emerges, in particularly from FIG. 4, the longitudinal axis 42 also forms the centre axis of the flat file 16. As also emerges, in particular from FIG. 4, the sharpening device 1 has centre plane 43 placed through the centre axis 42 and receiving it. Provided perpendicular to this centre plane 43 is also a transverse plane 44, the cutting line of the centre plane 43 and the transverse plane 44 forming the longitudinal axis 42. The pair of guide rods 19, 19', the associated round file 14 and the associated file face 39 are virtually brought by rotation through 180° about the longitudinal axis 42 into the position of the guide rods 20, 20' with the associated round file 15 and associated file face 39'. The arrangement of these functional units is therefore rotationally symmetrical with respect to the longitudinal axis 42. The guide rods 19, 19', on the one hand, and the guide rods 20, 20', on the other hand, and the round files 14, 15 and the file faces 39, 39' are offset with respect to the centre plane 43, in each case, in the direction of the transverse plane 44 in such a way, that during filing of a cutting tooth 2 the parts provided for sharpening the cutting tooth 2' do not collide with the saw chain 1.

The mutually opposing side faces 45, 46 of the head parts 17, 18, in other words the side faces 45, 46, which face the files 14, 15, 16 and the guide rods 19, 19', 20, 20' extend parallel to one another and at an angle γ with respect to the longitudinal axis 42 of the sharpening device, which approximately corresponds to the sharpening angle α or α'. To sharpen the cutting teeth 2, 2', the sharpening device is set with respect to the longitudinal direction 7 of the saw chain 1 in such a way that the saw chain 1 and the side faces 45, 46 extend approximately parallel to one another.

As the sharpening device is used in accordance with the above description in different working directions corresponding to the direction arrows 40, 41, the file faces 39, 39', unlike normal flat files, have file cuts 47, 47' or file teeth arranged in a different direction on the two file faces 39, 39'.

What is claimed is:

1. A sharpening device for manually sharpening cutting teeth (2, 2') of saw chains (1) for chain saws, said sharpening device comprising
    a longitudinal axis (42) extending in a longitudinal direction of the sharpening device,
    a frame (13), which has
        a first head part (17) and a second head part (18) arranged at a spacing from each other and
        two pairs of two guide rods (19, 19', 20, 20'), which are arranged parallel to one another and to the longitudinal axis (42) and rigidly connect the first head part (17) and the second head part (18) to each other,
    one round file (14, 15) associated with each pair of guide rods (19, 19', 20, 20') and arranged parallel to the longitudinal axis (42),
        said round files (14, 15) being held in the first head part (17) and the second head part (18) without play in the longitudinal direction (42) and transverse thereto, but exchangeably in round file receivers (21, 22, 29, 30),
    two mutually parallel file faces (39, 39') provided on one flat file (16), which is held without play in the longitudinal direction (42) and transverse thereto, but exchangeably in flat file receivers (23, 31),
    wherein the pairs of the guide rods (19, 19', 20, 20') and the respectively associated round files (14, 15) and the file faces (39, 39') are rotationally symmetrically arranged with respect to the longitudinal axis (42).

2. A sharpening device according to claim 1, wherein one head part (18) of the first head part and the second head part has a loading flap (27), which, in an opened position, releases two of said round file receivers (29, 30) and one flat file receiver (31) of said flat file receivers configured in said one head part (18) of the first head part (17) and the second head part (18) and closes them in a closed state.

3. A sharpening device according to claim 2, wherein abutments (24, 25, 26, 32, 33, 34) for fixing the round files (14, 15) and the one flat file (16) in the direction of the longitudinal axis (42) are associated with the round file receivers (21, 22, 29, 30) and the flat file receivers (23, 31).

4. A sharpening device according to claim 3, wherein the abutments (32, 33, 34) configured on said one head part (18) having the loading flap (27) are configured on the loading flap (27).

5. A sharpening device according to claim 1, wherein the mutually parallel file faces (39, 39') of the one flat file (16) have file cuts (47, 47') directed in opposite directions.

6. A sharpening device according to claim 1, wherein abutments (24, 25, 26, 32, 33, 34) for fixing the round files (14, 15) and the one flat file (16) in the direction of the longitudinal axis (42) are associated with the round file receivers (21, 22, 29, 30) and the flat file receivers (23, 31).

* * * * *